Feb. 21, 1967 J. GREMILLET 3,305,789

UNIDIRECTIONAL HELICON-EFFECT PARAMETRIC AMPLIFIER

Filed Jan. 11, 1966 2 Sheets-Sheet 1

Feb. 21, 1967 J. GREMILLET 3,305,789

UNIDIRECTIONAL HELICON-EFFECT PARAMETRIC AMPLIFIER

Filed Jan. 11, 1966 2 Sheets-Sheet 2

United States Patent Office 3,305,789

Patented Feb. 21, 1967

3,305,789

UNIDIRECTIONAL HELICON-EFFECT PARAMETRIC AMPLIFIER

Jacques Gremillet, Paris, France, assignor to CSF—Compagnie Generale de Telegraphie San Fil, a corporation of France Filed Jan. 11, 1966, Ser. No. 519,890
Claims priority, application France, Jan. 19, 1965, 2,442
3 Claims. (Cl. 330—4.9)

The present invention relates to parametric amplifiers of the type wherein use is made of the variations in the capacitance of a reversely biased semi-conductor diode, as a function of the voltage applied to it by a pumping oscillator.

Known amplifiers of this type present two drawbacks:

(a) The signal is applied across a certain length of the semi-conductor body causing important losses in the arrangement.

(b) The parametric diode does not, by itself, provide any insulation against a possible transfer of energy from the load to the generator between which it is mounted and this necessitates the use of an insulator or circulator, generally of the ferrite type.

It is an object of this invention to avoid these drawbacks. According to the invention, there is provided a unidirectional parametric amplifier comprising: a first waveguide, means for propagating a high frequency signal along said waveguide, means for circularly polarizing said signal in at least a portion of said waveguide, a diode placed in said portion, means for generating in said portion a direct current magnetic field, a pumping source, and a second waveguide coupling said pumping source to said first waveguide.

For a better understanding of the invention and to show how the same may be carried into effect, reference will be made to the drawings accompanying the following description and wherein.

In all the figures of the drawing, the same elements are designated by the same reference numerals; for clarity the relative proportions of the different elements are not drawn to scale.

In the embodiment of the invention described by way of example. a parametric diode amplifier receives a signal at a frequency *fs* to be amplified, a "pumping signal" at a frequency signal *fp*, which has the purpose of supplying the energy required for the amplification, whilst an idler circuit permits the tuning on the frequency *fp–fs*.

Figure 1:
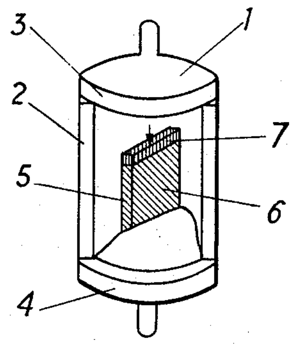
FIG. 1 shows a diode used in an amplifier according to the invention.

FIG. 1 shows diagrammatically a parametric diode. It comprises a housing 1, formed by a ceramic envelope 2 equipped with two brass flanges 3 and 4. The actual diode 5 is mounted inside housing 1 and is formed by a homogeneous strip 6 of a semi-conductor material including a junction 7 formed by alloying or any other manner known in the art.

According to one feature of the invention, the semi-conductor 6 is so selected that the helicon effect may be easily obtained at the desired frequency and temperature.

The following characteristics are required for the materials used in semiconductors which give rise to the helicon effect.

The value of the electron mobility must be such as the product of said mobility and of the direct current magnetic field is very large in comparison with one;

The cyclotron frequency corresponding to the direct current magnetic field must be very large in comparison with the signal frequency to be amplified.

These characteristics depend, generally, on the temperature of said semi-conductor.

By way of example, this semi-conductor is InSb.

In this case, the amplifier can be operated at the room temperature.

For clarity, neither the connections nor the D.C. bias is shown in the drawing.

According to a further feature of the invention, the diode 5 is placed inside a waveguide 8 making possible the propagation across the semi-conductor of a circularly polarized electrical wave, whilst a magnetic induction, whose direction is perpendicular to that of the plane in which the polarization takes place, is applied to the semi-conductor which is affected under these conditions by the helicon effect.

Figure 2:
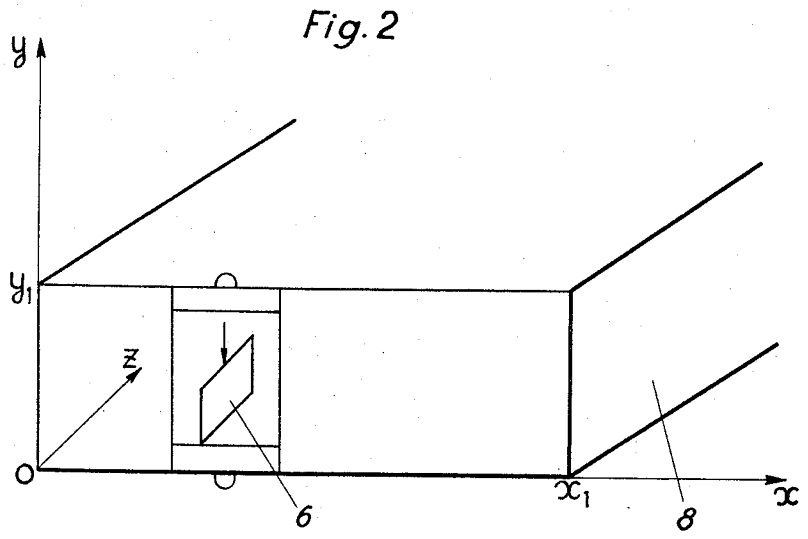
FIGS. 2 and 3 show the conditions under which the diode must be mounted in order for the helicon effect to occur.

For example, waveguide 8 is rectangular and the diode 5 is mounted, as shown in FIG. 2, in this guide so as to meet the following three conditions:

(a) The sides $x_1$ and $y_1$ of the rectangular waveguide 8 are selected to make possible the propagation of a wave in mode $TM_{11}$;

(b) The plane of the semi-conductor 6 is parallel to the direction O–Z of the wave propagation i.e. perpendicular to plane O*x*, O*y*, of the cross-section of the guide;

(c) The diode is placed between the two large walls of the guide into a region thereof where the polarization of the wave is circular.

Figures 3, 4:
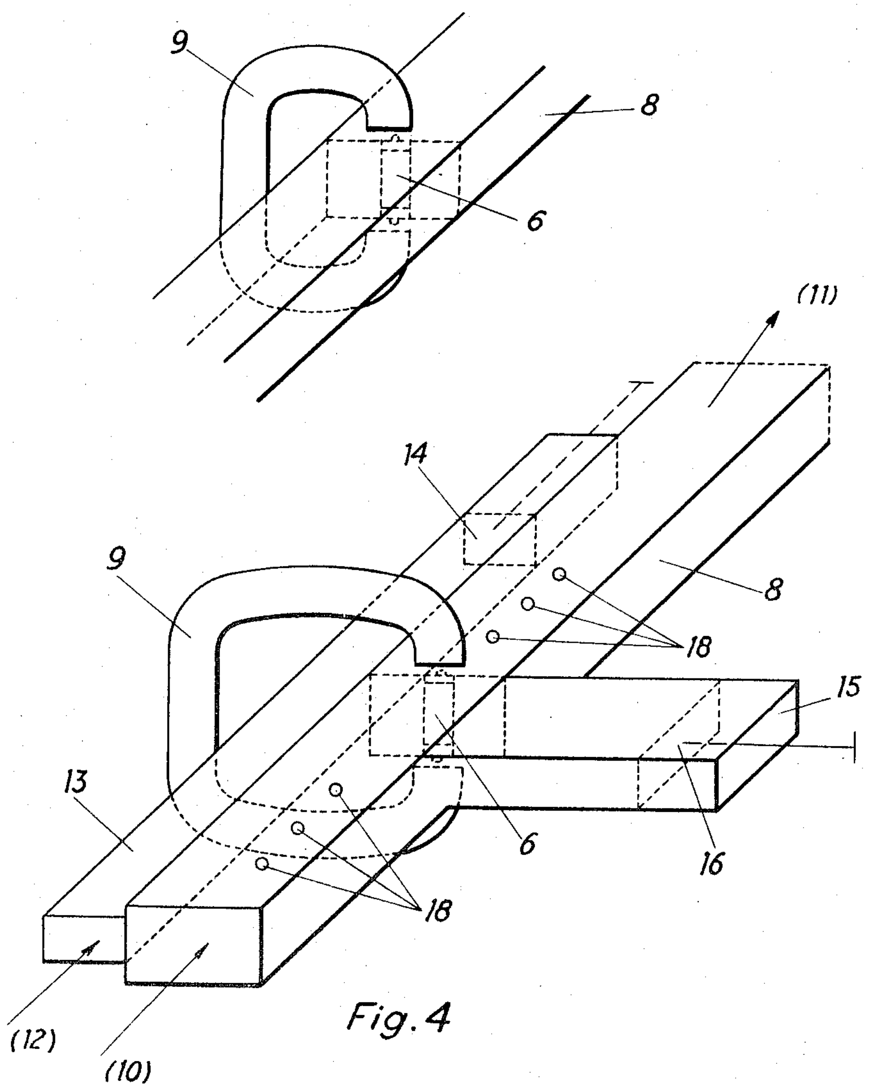
FIG. 4 shows a general diagram of a parametric amplifier according to the invention.

With these three conditions fulfilled, the helicon effect appears in the semi-conductor 6 if the magnetic induction is applied parallel to O*y*, by an external permanent magnet 9, as shown diagrammatically in FIG. 3.

FIG. 4 shows very diagrammatically an embodiment of a parametric amplifier according to the invention.

The parametric diode 6 is mounted inside the waveguide 8 which connects the generator 10, providing the signal to be amplified, with the load 11 under the conditions outlined above and illustrated in FIGS. 2 and 3 and which give rise to the helicon effect in the semi-conductor 6. The magnetic induction is obtained by means of a permanent magnet 9. The propagation in the $TM_{11}$ mode is assured by suitably selecting the dimensions and excitation of the guide 8 and the diode 6 is placed in a region thereof in which the wave has a substantially circular polarization. A pumping generator, for example a klystron 12, applies to the diode 6 the pumping signal having a frequency *fp* through a guide 13 and the impedance matching of the pump generator to the system is obtained by means of a movable short circuit 14. The coupling between the pump 13 and the wave guide 8 is not shown and is assured as is well known in the art, for example by means of a slot.

The idler circuit 15 is tuned, by means of an adjustable short-circuit 16, to the frequency *fp–fs*.

When the electromagnetic wave with suitable polarization is propagated from the generator 10 towards the load 11 with the helicon effect, the semi-conductor 6 with the junction 7 is rendered transparent, i.e., it behaves relative to the wave like a perfect dielectric. The equivalent diagram of the diode no longer comprises, as in the case of a normal parametric diode, a resistance, representing the losses in the semi-conductor, in series with the variable capacitance, but two capacitances in series, namely the variable junction capacitance and the fixed capacitance, corresponding exactly to the dielectric which is formed by the semi-conductor subjected to the helicon effect. This assembly results therefore in the elimination of the losses in the semi-conductor.

Considering now the propagation in the opposite direction, i.e. from the load 11 towards the generator 10, the sense of the polarization of the wave is reversed. Due to the helicon effect, the high-frequency current can no longer propagate through the semi-conductor 6 which is in series with the junction 7 and everything takes place as if the diode were in open circuit. It follows that no amplification can take place in this direction and the energy transmitted to the load is much less than in the preceding case. This arrangement is therefore unidirectional and it is only necessary to provide an insulation between the pump and the load, which may be effected by any known means, such as tuning screws, shown, for example, diagrammatically at 18 in FIG. 4.

Of course, the invention is not limited to the embodiments hereinbefore described which were given solely by way of example.

What is claimed is:

1. A unidirectional parametric amplifier comprising: a first waveguide, means for propagating a high frequency signal wave along said waveguide, means for circularly polarizing said signal wave in at least a portion of said waveguide, a diode placed in said portion said diode being made of a semiconductor, in which the helicon effect is easily obtained at the operating signal frequency, means for generating in said portion a direct current magnetic field directed perpendicularly to the plane of polarization of the wave, a pumping source, a second waveguide coupling said pumping source to said first waveguide and a tunable idler circuit coupled to said diode.

2. A unidirectional parametric amplifier according to claim 1, wherein the cross-sectional dimensions of said first waveguide allow the transmission of said signal in the $TM_{11}$ mode.

3. A unidirectional parametric amplifier according to claim 1, wherein said semi-conductor diode is in a plane parallel to the propagation direction of said signal.

No references cited.

ROY LAKE, *Primary Examiner.*

D. HOSTETTER, *Assistant Examiner.*